Figure 1:
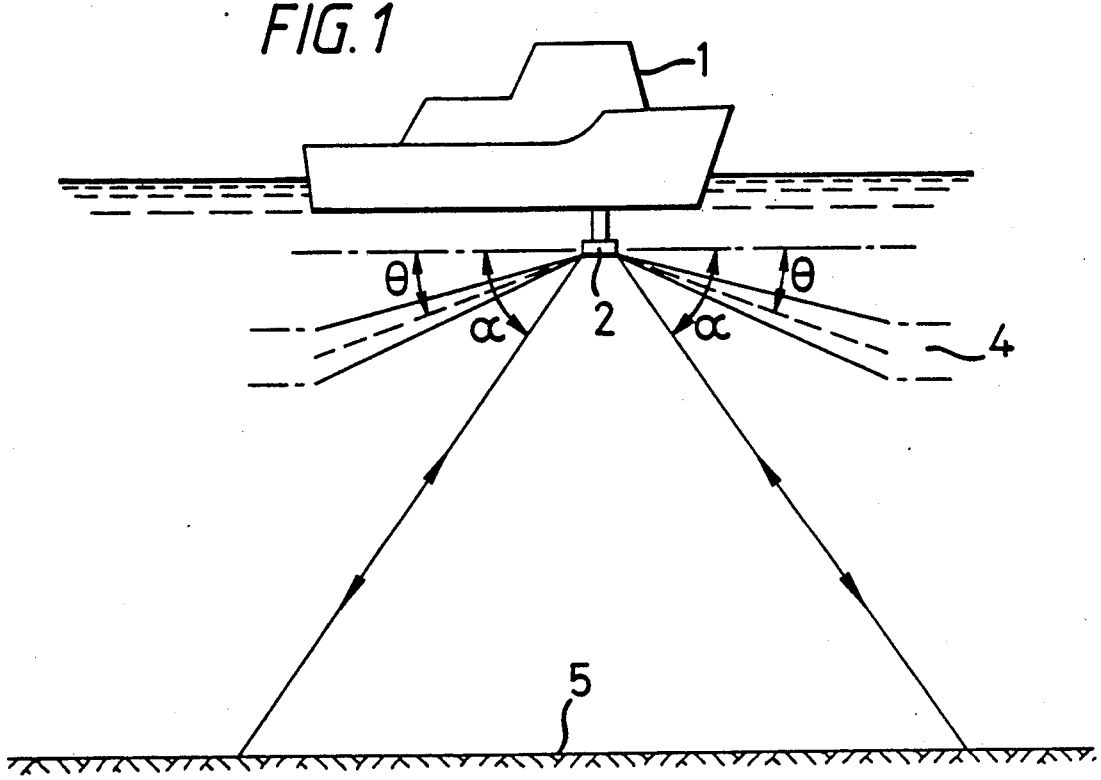

United States Patent [19]

Buddery

[11] Patent Number: 5,050,133
[45] Date of Patent: Sep. 17, 1991

[54] MARINE CURRENT DETERMINATION

[75] Inventor: David L. Buddery, Camberley, England

[73] Assignee: The British Petroleum Company p.l.c., London, England

[21] Appl. No.: 655,239

[22] Filed: Feb. 12, 1991

Related U.S. Application Data

[63] Continuation of Ser. No. 517,009, May 1, 1990, abandoned.

[30] Foreign Application Priority Data

May 4, 1989 [GB] United Kingdom ............... 8910184

[51] Int. Cl.$^5$ ............................................. G01S 15/60
[52] U.S. Cl. ..................................................... 367/91
[58] Field of Search ........................... 367/89, 90, 91; 73/861.25, 861.18, 170 A

[56] References Cited

U.S. PATENT DOCUMENTS

| | | | |
|---|---|---|---|
| 4,104,912 | 8/1978 | Clavelloux et al. | 367/91 |
| 4,138,657 | 2/1979 | Shave | 367/91 |

FOREIGN PATENT DOCUMENTS

| | | |
|---|---|---|
| 0200041A2 | 11/1986 | European Pat. Off. |
| 1274054A | 5/1972 | United Kingdom . |
| 2036969 | 7/1980 | United Kingdom . |
| 2040454A | 8/1980 | United Kingdom . |
| 2011076 | 5/1982 | United Kingdom . |

Primary Examiner—Daniel T. Pihulic
Attorney, Agent, or Firm—Larry W. Evans; Joseph G. Curatolo; Teresan W. Gilbert

[57] ABSTRACT

A method for the determination of in-line and cross-line components of water velocity relative to a vessel heading on a chosen line, which method comprises the steps of:

(a) generating electronic pulses and relaying these to a Doppler-Sonar transducer aligned fore and aft with respect to the keel of the vessel, (b) radiating pulses from the Doppler-Sonar transducer in a number of directions at an angle $\theta$ relative to the horizontal to a layer of water below but near to the surface of the water, and, simultaneously, (c) radiating pulses from the Doppler-Sonar transducer in a number of directions at an angle $\alpha$ relative to the horizontal, and greater than $\theta$, to the sea bed, (d) detecting reflected signals from the pulses of stage (b), comparing the frequency of the reflected signals with the frequency of the transmitted signals, and computing the water velocity relative to the vessel, and, simultaneously, (e) detecting reflected signals from the pulses of stage (c), comparing the frequency of the reflected signals with the frequency of the transmitted signals and computing the velocity of the vessel relative to the sea bed, and (f) computing the water velocity relative to the chosen line heading and at right angles to this heading.

12 Claims, 2 Drawing Sheets

MARINE CURRENT DETERMINATION

This is a continuation of application Ser. No. 517,009, filed on May 1, 1990, now abandoned.

This invention relates to a method for the simultaneous determination of in-line and cross-line components of water velocity relative to a vessel heading on a chosen line on waters affected by tides and/or currents, utilizing an acoustic Doppler - Sonar system.

To avoid undue repetition in the following specification, the word "current" is intended to include tides and non-tidal currents. Similarly, the word "water" is intended to include all bodies of water affected by such movements, including seas, lakes and large rivers.

The method is particularly suitable for generating information for controlling the operation of a vessel engaged in marine seismic surveys, particularly 3D surveys.

For the purpose of examining underwater subterranean strata, air guns have been employed as a seismic source. In operation an air gun produces a pulsating high pressure air bubble which is a source of pressure pulses. The latter penetrate the sea bed and subterranean strata and are reflected at interfaces between strata. The reflected pulses are detected by hydrophones and recorded, and, when interpreted, give useful information about the shape and depth of the strata.

In a 3D seismic survey an array of airguns and a streamer containing hydrophones is towed behind a survey vessel. The area to be surveyed is divided into sail lines typically between 25 and 200 m apart and the vessel is intended to sail up and down these lines.

In waters subject to tides and/or currents, unless the vessel itself is aligned directly with the flow of water its progress will be offset at an angle, the feather angle, which is proportional to both velocity and direction of the water flow rate. This in effect means that the seismic reflections will be off line and in a significant number of cases the survey along the intended line will be unsatisfactory and must be repeated later by so-called "infilling".

The daily cost of a marine seismic survey is considerable and a typical infill amounts to about 15% of the sail lines.

Previous attempts to reduce the amount of infilling required have relied upon current (e.g. tidal) predictions or ad-hoc methods. One such method involves plotting the measured on-line streamer feather angle against time on a sheet of continuous graph paper. This method only allows a historic record of the current monitoring to be built up and the data suffers from being under-sampled. The only times at which information is available are those when the vessel is on-line with the streamer straight. There is no information available during periods of time sharing. During periods of weather downtime, the information ceases totally. The data may be affected as a result of poor steering which provides the data with false feather angles and therefore gives a wrong impression of the current.

We have now devised an improved, direct and real time method for determining such information, and utilizing it to operate the survey vessel in such a manner that the seismic data is more accurately acquired along the planned survey lines, and the amount of infilling required is reduced.

Thus according to the present invention there is provided a method for the determination of in-line and cross-line components of water velocity relative to a vessel heading on a chosen line, which method comprises the steps of:

(a) generating electronic pulses and relaying these to a Doppler-Sonar transducer, which should be aligned fore and aft with respect to the keel of the vessel, (b) radiating pulses from the Doppler - Sonar transducer in a number of directions at an angle $\theta$ relative to the horizontal to a layer of water below but near to the surface of the water, and, simultaneously, (c) radiating pulses from the Doppler Sonar transducer in a number of directions at an angle $\alpha$ relative to the horizontal, and greater than $\theta$, to the water bed, (d) detecting reflected signals from the pulses of stage (b), comparing the frequency of the reflected signals with the frequency of the transmitted signals, and computing the water viscosity relative to the vessel, and, simultaneously, (e) detecting reflected signals from the pulses of stage (c), comparing the frequency of the reflected signals with the frequency of the transmitted signals and computing the velocity of the vessel relative to the water bed, and (f) computing the water velocity relative to the chosen line heading and at right angles to this heading.

Preferably these two orthogonal water velocity figures are computed and displayed as a function of time.

Doppler - Sonar transducers are known per se.

Preferably the pulses are radiated in four mutually orthogonal directions at the angle $\theta$ and also in four mutually orthogonal directions at the angle $\alpha$.

Conveniently the pulses radiated at the angle $\theta$ and at the angle $\alpha$ will be generated at the same frequency when operating in shallow water, but this is not essential. However, when operating in deeper water it may be advantageous for the pulses radiated at the angle $\alpha$ to be generated at a lower frequency.

The pulses radiated at the angle $\theta$ are suitably generated at a frequency conventionally used in Doppler Sonar transducers, e.g. a frequency in the range 200–300 kHz.

Information regarding the vessel heading relative to the chosen line heading will be obtained from the vessel's gyrocompass.

The information may be corrected for roll and pitch of the vessel by known methods.

The signals are reflected from the layer of water below but near to the surface by means of scattering bodies, such as plankton, pieces of seaweed or other vegetable matter, suspended sediment, etc.

The computations are carried out in a mini-computer.

The velocity measurements are preferably averaged over a period of about 2–15 minutes, most preferably about 5.

The time axis may be run for a period, e.g. for 2–5 days in the past, most preferably about 48 hours, and the two orthogonal current velocities are predicted ahead for a further period, e.g. the next 12–48 hours, preferably the next 24 hours. The most recent current information is referred to as the "real time" current information.

This information permits more efficient control of a seismic survey by enabling the operator to select optimum sail lines at any time in which the feather angle is minimized, thereby reducing the need for subsequent infilling. The assistance to the decision making process derives from the knowledge of the current occurring at the time, further aided by a prediction of future current behavior.

Figure 2:
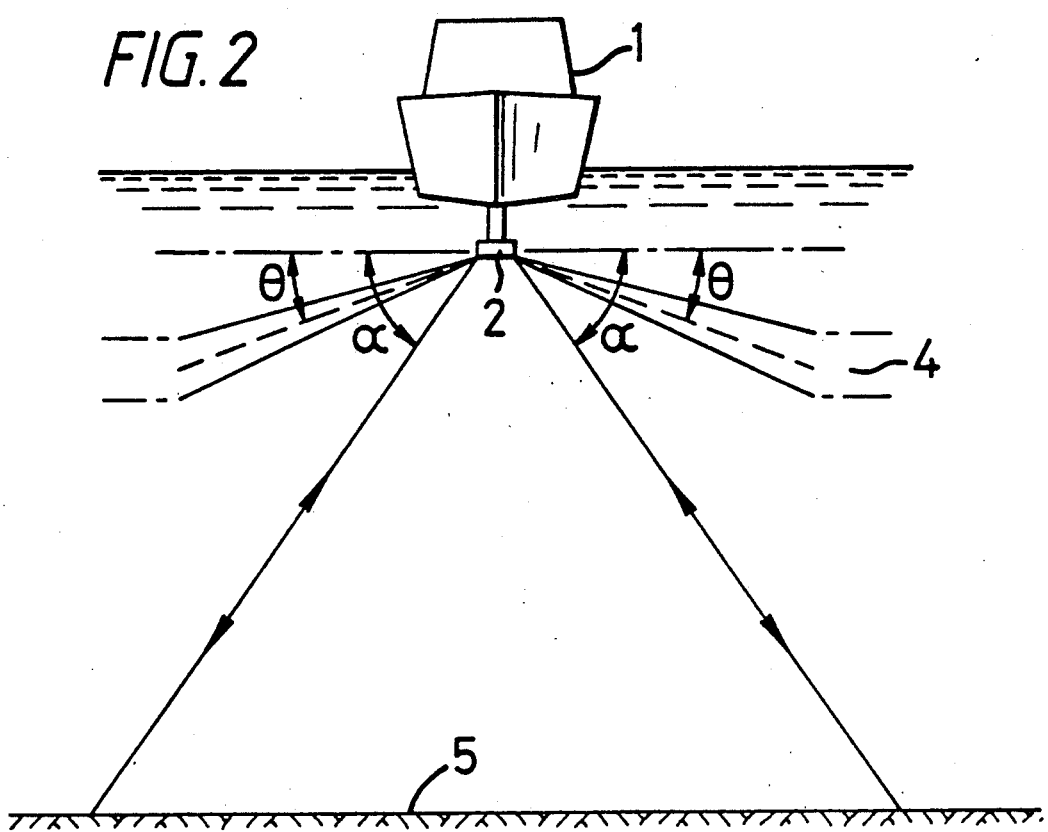
Figure 3:
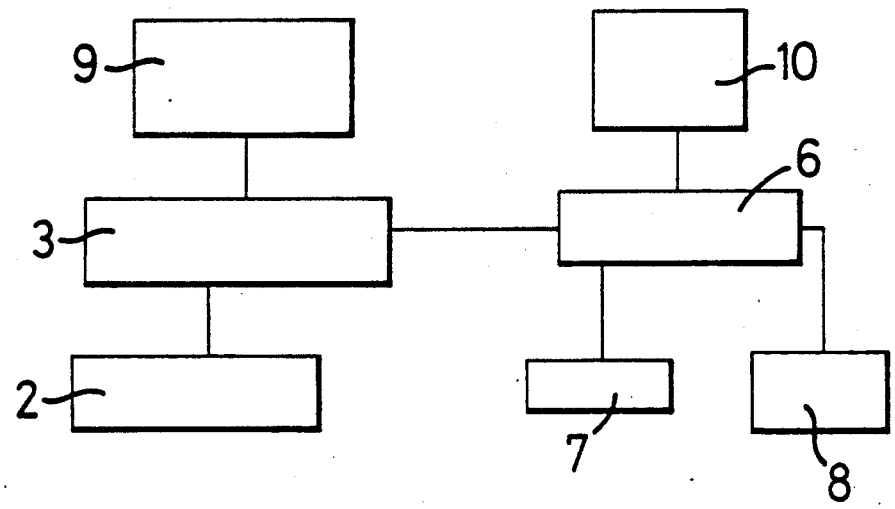

The invention is illustrated with reference to FIGS. 1 to 3 of the accompanying drawings wherein:

FIG. 1 illustrates the determination of in-line components of water velocity relative to a vessel and of the vessel velocity relative to the sea bed FIG. 2 is similar to FIG. 1 but illustrates the determination of cross-line components FIG. 3 is a schematic diagram showing the equipment deployed and its interconnection.

A seismic survey vessel (1) is fitted with a Doppler - Sonar transducer (2) aligned fore and aft relative to the vessel's keel.

A system electronics unit (3) generates electronic pulses which are sent to the transducer (2). The transducer is designed to look downwards at an angle $\theta$ to the horizontal. By means of the knowledge of this angle, the velocity of sound in water and Pythagoras' principle, a reflected signal return is obtained from scattering bodies located within a defined layer of sea water (4) approximately 4 meters thick. The center of this 4 meter thick layer of sea water is located at a depth selected in increments of 4 meters (measured from the transducer depth below the surface). The 4 meter thick layer is a direct result of the "half power cone angle" of the acoustic radiation produced by the transducer (2) and by consideration of the two-way-travel time at the velocity of sound in water.

A signal travels also at a steeper angle $\alpha$ to the sea bed (5), from where it is reflected and returns to the transducer (2). The reason for the steeper angle is to reduce the total distance travelled by the signal and hence the loss due to geometric spreading.

The signals to and from the water layer and from the sea bed are made in four mutually orthogonal directions.

The system electronics unit (3) compares the frequency of the reflected signal returns relative to the transmitted frequency. A number proportional to this reflected signal frequency difference and hence mathematically related to the Doppler effect is output by the system electronics unit (3) to a minicomputer (6) with an associated keyboard (7) and a printer (8) for the defined water layer water velocity and for the velocity of the sea bed (both of these being relative to the ship). The ship's heading as determined by the gyrocompass (9) is simultaneously output to the minicomputer (6) as heading information via the electronics unit (3).

The viscosity measurements are averaged in the mini computer (6) over a period of about 5 minutes. The mini computer then computes the water velocity relative to the chosen line heading and at right angles to this heading and displays these two orthogonal velocity figures relative to time on the VDU (10).

The time axis runs for 48 hours in the past and the two orthogonal current velocities are predicted ahead for the next 24 hours.

I Claim:

1. A method for the determination of in-line and cross-line components of water velocity relative to a vessel heading on a chosen line, which method comprises the steps of:
   (a) generating electronic pulses and relaying these to a Doppler - Sonar transducer,
   (b) radiating pulses from the Doppler - Sonar transducer in a number of directions at an angle $\theta$ relative to the horizontal to a layer of water below but near to the surface of the water, and, simultaneously,
   (c) radiating pulses from the Doppler Sonar transducer in a number of directions at an angle $\alpha$ relative to the horizontal, and greater than $\theta$, to the water bed,
   (d) detecting reflected signals from the pulses of stage (b), comparing the frequency of the reflected signals with the frequency of the pulses radiated and computing the water velocity relative to the vessel, and, simultaneously,
   (e) detecting reflected signals from the pulses of stage (c), comparing the frequency of the reflected signals with the frequency of the pulses radiated and computing the velocity of the vessel relative to the sea bed, and
   (f) computing the water velocity relative to the chosen line heading and at right angles to this heading.

2. A method according to claim 1 wherein the Doppler - Sonar transducer is aligned fore and aft with respect to the keel of the vessel.

3. A method according to claim 1 wherein the water velocity relative to the chosen line heading and at right angles to this heading are computed and displayed as a function of time.

4. A method according claim 1 wherein the pulses are radiated in four mutually orthogonal directions at the angle $\theta$.

5. A method according to claim 4 wherein the pulses are radiated in four mutually orthogonal directions at the angle $\alpha$.

6. A method according to claim 1 wherein the pulses radiated at the angle $\theta$ and at the angle $\alpha$ are generated at the same frequency.

7. A method according to claim 1 wherein the pulses radiated at the angle $\alpha$ are generated at a lower frequency than the pulses generated at the angle $\theta$.

8. A method according to claim 1 wherein the pulses radiated at the angle $\theta$ are generated at a frequency in the range 200–300 kHz.

9. A method according to claim 1 wherein the information is corrected for roll and pitch of the vessel.

10. A method according to claim 1 wherein the velocity measurements are averaged over a period of 2–15 minutes.

11. A method according to claim 1 wherein the time axis is run for a period of 2–5 days in the past.

12. A method according to claim 1 wherein the time axis is run for a period of 12–48 hours in the future.

* * * * *